May 30, 1933.  J. A. DEAL  1,911,438
HOT AIR DISTRIBUTING APPARATUS FOR AUTOMOBILES
Filed March 23, 1932  3 Sheets-Sheet 1

Inventor
James A. Deal

By Clarence A. O'Brien
Attorney

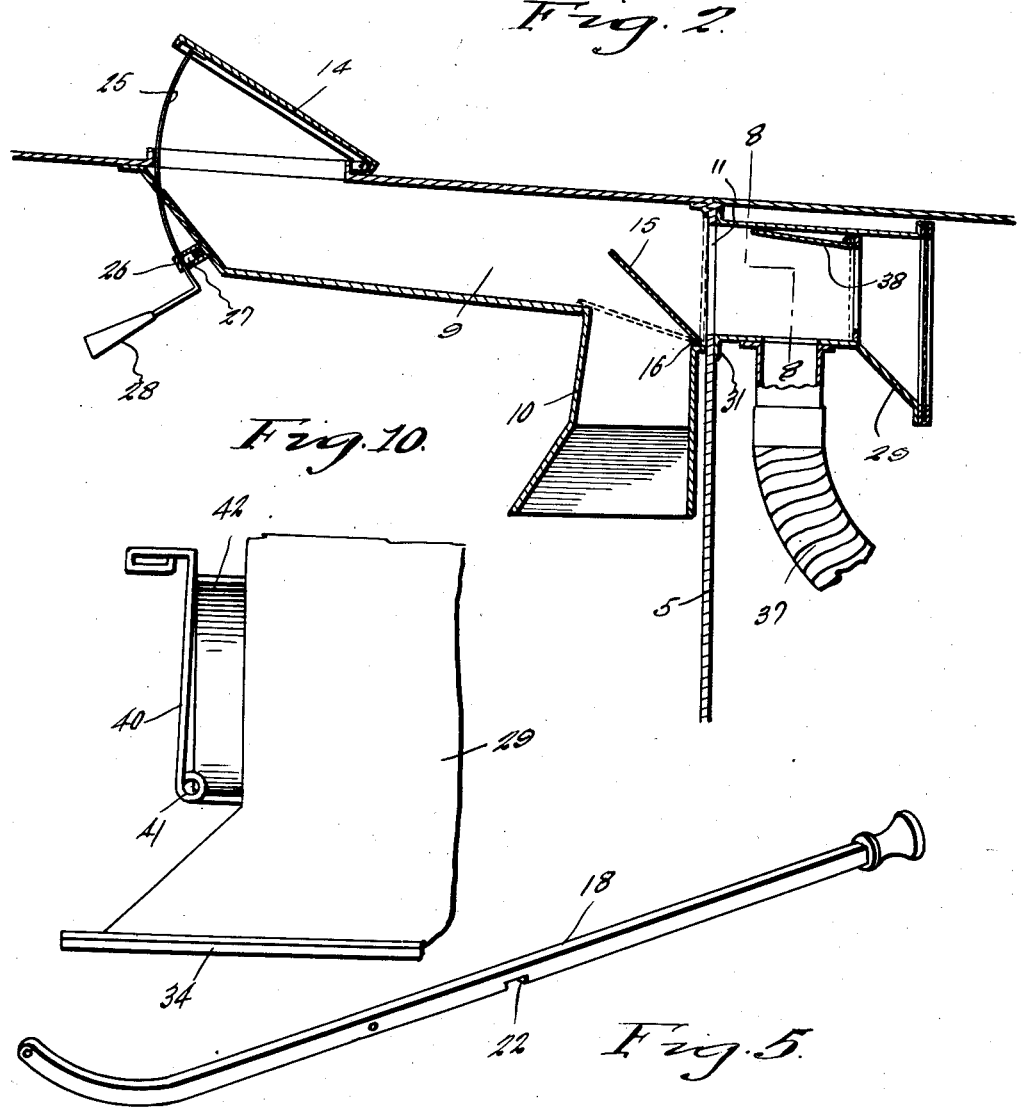

May 30, 1933.  J. A. DEAL  1,911,438
HOT AIR DISTRIBUTING APPARATUS FOR AUTOMOBILES
Filed March 23, 1932    3 Sheets-Sheet 3
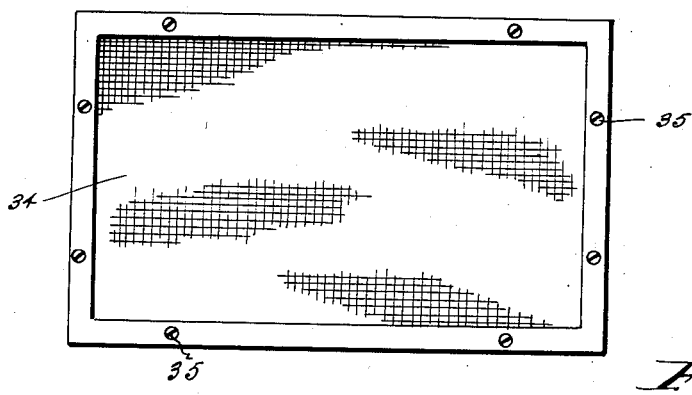
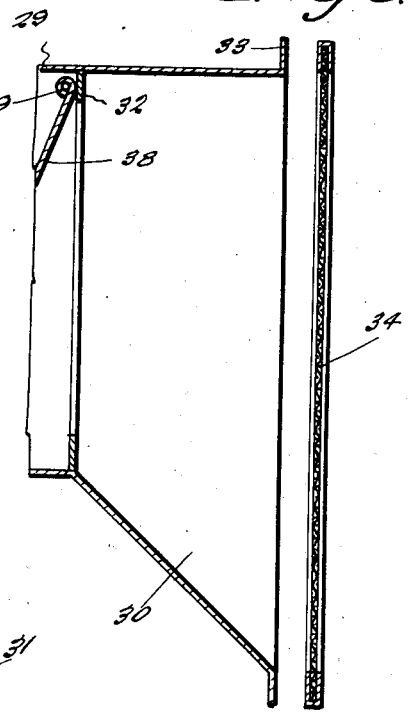
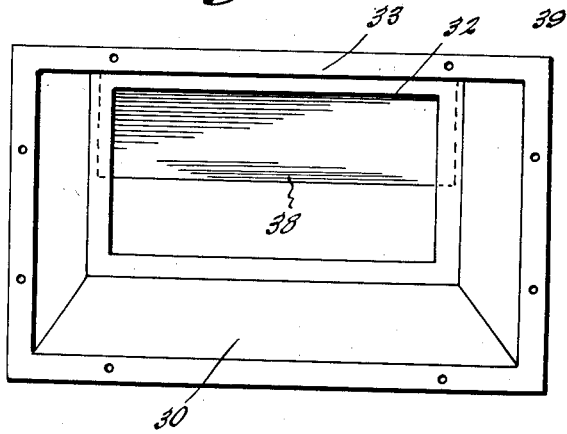
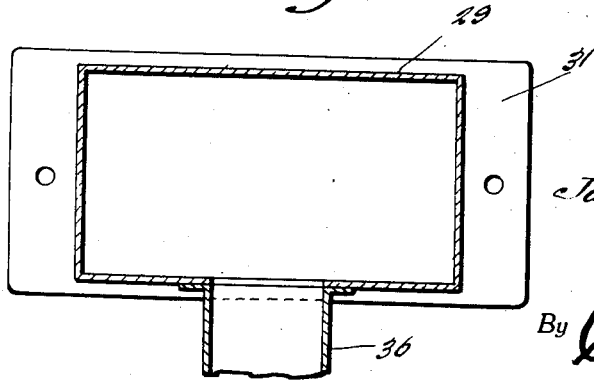
Inventor
James A. Deal
By Clarence A. O'Brien
Attorney Patented May 30, 1933

1,911,438

UNITED STATES PATENT OFFICE

JAMES A. DEAL, OF MARION, OHIO

HOT AIR DISTRIBUTING APPARATUS FOR AUTOMOBILES

Application filed March 23, 1932. Serial No. 600,801.

This invention relates to an apparatus for use in automobiles for the purpose of directing hot air either to the interior of the automobile or to the outside of the windshield to prevent formation of sleet and the like on the windshield.

The present invention is an improvement over the apparatus embodying the subject matter of an application for patent filed by me March 26, 1931, Serial No. 525,581.

The present invention is an improvement over the apparatus disclosed in my above referred to application for patent, in that said present invention is equipped with means whereby air may be distributed to the interior of the automobile or to the outside of the windshield either directly from a manifold, stove or to distribute such air heated by contact with the engine.

The present invention together with its numerous objects and advantages will be best understood from a study of the following description taken in connection with the accompanying drawings wherein:

Figure 2 is a longitudinal sectional elevational view through the apparatus, the same being shown applied to the automobile.

Figure 1:
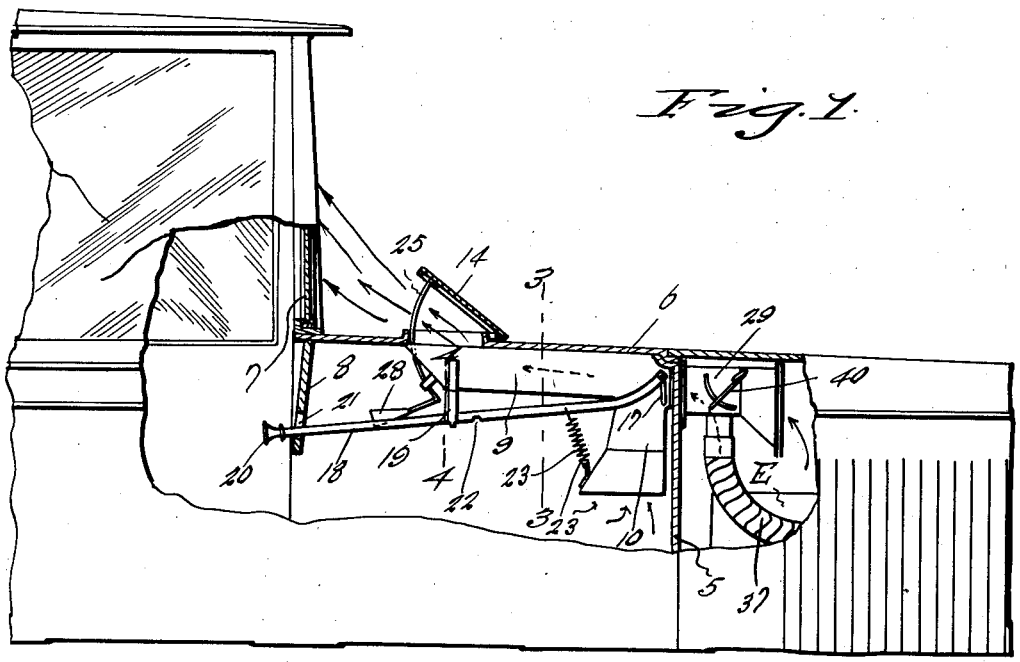
Figure 1 is a fragmentary sectional elevational view through the forward portion of an automobile showing my invention applied thereto.
Figure 3:
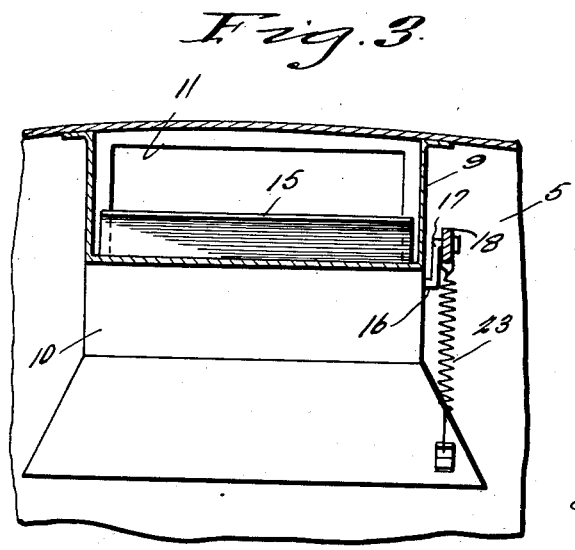
Figure 4:
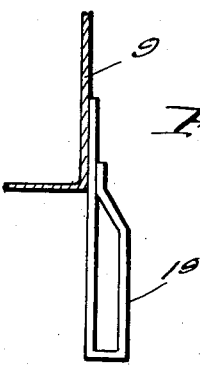

Figures 3 and 4 are sectional views taken substantially on the lines 3—3 and 4—4 respectively of Figure 1.

Figure 5 is a perspective view of a control rod.

Figure 6 is a front elevational view of a casing forming part of the invention.

Figure 7 is a front elevational view of said casing with the screen removed.

Figure 8 is a sectional view taken substantially on the line 8—8 of Figure 2.

Figure 9 is a sectional elevational view through the casing with the screen shown separate therefrom.

Figure 10 is a top plan view of a portion of the casing shown in Figure 7.

Referring more in detail to the drawings it will be seen that the numeral 5 denotes the dashboard, the numeral 6 the cowl, the numeral 7 the windshield, and the numeral 8 the instrument board of an automobile.

For directing air heated by the internal combustion engine E into the interior of the automobile for raising the temperature thereof, or for directing heated air to the outer side of the windshield 7 there is provided an apparatus which is described more in detail in my referred to application and which, as herein shown comprises an angular conduit formed with a horizontal branch 9 communicating at its front with a depending or vertical branch 10. The branch 9 is disposed under the cowl 6 while the branch 10 is disposed against the rear side of the dash board 5. The dash board 5 has an opening 11 registering with the interior of the conduit branch 9. The cowl has an opening in the casing with the rear portion of the conduit 9 and in this last mentioned opening is hingedly mounted as at 12 a closure 14. A closure 15 is mounted in the opening 11 to swing with a shaft 16 controlled by a crank 17 disposed to one side of the conduit. A rod 18 is slidable through a bracket 19 depending from the rear end of the conduit branch 9 and is connected at its forward end to crank 17.

The rod 18 is slidable through a slot 21 in the instrument board 8 and terminates at its rear end in a knob or handle 20. In the bottom edge of rod 18 are formed a pair of notches 22 for engaging with the bracket 19. A spring 23 is engaged with the rod 18 and anchored on the lower portion of the vertical branch 10, and when the rod 18 is pulled rearwardly this spring tends to pull the forward end of the rod downwardly with a notch 22 engaged with the rod 19 to thereby retain the closure 15 in dotted line position shown in Figure 2. If it is desired to merely open the door 15 so that it will be retained in the full line position shown in Figure 2, the second notch of the rod 18 will be engaged with the bracket 19.

A curved rod 25 is secured to the closure 14 being secured thereto as will be apparent from an inspection of the drawings. The rod 25 extends downwardly through the rear end portion of the branch conduit 9 and adjacent its lower end is equipped with a suitable handle as shown. Adjacent said end the rod 25 operates in a suitable guide 26 and is frictionally retained at the desired adjustment by being engaged with a spring pressed plunger 27 operating in said guide (see Figure 2).

Obviously by grasping the handle 28, the rod 25 may be easily manipulated for placing the closure 14 in the desired adjustment. With the closures 14 and 15 in the full line positions, suggested in Figure 2 hot air from the engine may be delivered both to the interior of the automobile and against the outer side of the windshield, it being apparent that air entering through the opening 11, and heated by contact by the engine 11 will be influenced by the closure 15 so that a portion of such air will be continued through the conduit 9 to discharge through the rear end of the conduit on to the windshield while the remaining part of such air will pass downwardly through the conduit branch 10 and rearwardly to the interior of the automobile. With closure 14 in a fully closed position and closure 15 in the position suggested by full line in Figure 2 all the hot air may be directed into the interior of the automobile. With closure 15 in the dotted line position shown in Figure 2 and the closure 15 in the open position suggested by the full line in said figure all the hot air may be directed against the outer side of the windshield to prevent the formation of snow, sleet and the like thereon.

As is well known, the internal combustion engine of automobiles may be readily equipped with what is known as a stove that is utilized for directing air against the exhaust manifolds of the engine for heating the air, the heated air being subsequently used either for heating the interior of an automobile, or for direction on to the windshield of an automobile for clear vision purposes, or for both of the purposes above mentioned.

In accordance with the present invention means is provided whereby air heated by contact with the automobile engine, or heated through the medium of a stove such as above mentioned, may be utilized for the purposes above suggested and upon such automobiles as may be equipped with the structure shown and described fully in my copending application and herein also above somewhat fully described.

To this end there is provided a casing 29 provided at its forward end with enlarged flared intake mouth 30. The casing 29 in the present instance is shown substantially rectangular, although any cross sectional shape may be used. The casing 29 is open at its rear end, and at said end is provided with a flange 30 to facilitate attachment of the casing to the forward side of the dash board 5 in alignment with the openings 11 as shown in Figure 2. Adjacent the forward end or flared mouth 30 the casing 29 is provided with an internal partition 32 that is provided with an opening as shown in Figure 9 communicating the mouth 30 with the interior of the casing 29. The mouth 30 is provided with a flange 33 and a screen 34 mounted in a suitable frame is secured in position over the inlet end of the mouth 30 through bolts or other fastening means suggested at 35.

The casing 29 has depending from the bottom side thereof a tubular inlet neck 36 to which is suitably coupled one end of a flexible conduit 37 leading from a suitable stove (not shown) and suitably engaged with the exhaust manifold of the internal combustion engine E.

The opening in the partition 32 is controlled through the medium of a closure 38 mounted to swing with a shaft 39 controlled by a crank arm 40 disposed exteriorly of the casing. At the junction of the shaft and arm 40 the rod forming such shaft and arm is twisted about itself to provide a spring 41 whereby tension is exerted on the arm 40 to retain the same in frictional contact with an arcuate keeper plate 42 suitably mounted on the proximate side of the casing 29.

With the parts shown in Figure 2, that is with the closure portion in open position the closure 15 is in the full line position and closure 28 swung to an open position it will be seen that heated air from the stove associated with the manifold of the internal combustion engine, as well as other heated air circulating under the hood, may be utilized for heating the automobile and the windshield; it being apparent that heated air from the stove will pass upwardly through the conduit 37 while the heated air circulating under the hood will pass through the screen 34 and the opening in the partition 32 to mingle with the heated air from the stove, and the hot and cold air will pass into the angular conduit, a portion of said air continuing through the conduit 9 to be directed on to the outer side of the windshield and the remaining part of such air continuing downwardly to the conduit branch 10 to the interior of the automobile.

It is also apparent, that the closure 38 may be swung secured in a position at an angle to the perpendicular with the closure 15 in the full line position shown in Figure 2, so that the closures 38 and 16 will act as a baffle, and in conjunction with screen 34 will serve to free the heated air of dust, dirt and other foreign particles so that pure air will enter into the interior of the automobile for heating purposes.

Whenever it is desired to use only the heated air directed from the stove of the manifold, closure 38 may be swung to a full closing position with respect to the opening in the partition 32 and the heated air from the manifold stove will then pass through the conduit 37, casing 29, and into and through the branches 9 and 10.

Even though I have herein shown and described the preferred embodiment of my invention, it is to be understood that I am fully aware that changes may be made therein without departing from the spirit of the invention and I accordingly claim all such forms of the invention to which I am entitled in view of the requirements of the prior art and the scope of the appended claims.

Having thus described my invention what I claim as new is:

1. In a device of the character described, an annular conduit having an outlet at one end positioned for directing heated air on to a windshield, and an outlet at a second end for directing heated air into the interior of the automobile, a hot air inlet port for the conduit intermediate the ends thereof, a valve controlling said hot air inlet and arranged to control the flow of heated air through said conduit, a casing connected with said conduit in line with said valve and provided with two hot air inlets, and means for connecting one of said hot air inlets with a hot air stove associated with the intake manifold of an internal combustion engine.

2. In a device of the character described, an annular conduit having an outlet at one end positioned for directing heated air on to a windshield, and an outlet at a second end for directing heated air into the interior of the automobile, a hot air inlet port for the conduit intermediate the ends thereof, a valve controlling said hot air inlet and arranged to control the flow of heated air through said conduit, a casing connected with said conduit in line with said valve and provided with two hot air inlets, and means for connecting one of said hot air inlets with a hot air stove associated with the intake manifold of an internal combustion engine, and a valve controlling the other of said hot air inlets.

3. In a device of the character described, a conduit provided with an outlet arranged to direct heated air on to a windshield, and a second outlet arranged to direct heated air to the interior of the automobile, said conduit being provided with a hot air inlet port, a casing connected with said conduit in line with said inlet port and provided with a hot air inlet, valve means controlling each of said hot air inlet ports, and means for connecting said casing with the heater stove of the manifold of an internal combustion engine.

4. In an automobile, the combination with a cowl having a ventilating opening, and a dash board provided with an opening, of an angular conduit disposed at one side of the dashboard and having at one end an outlet opening registering with the ventilating opening in the cowl, and at its other end an outlet opening for directing heated air into the interior of the automobile, said conduit intermediate its ends being provided with an intake opening registering with the opening in said dashboard, a valve controlling said inlet opening, control means for the valve, a casing arranged at a relatively opposite side of the dashboard and being open at each end, said casing having one end thereof registering with the opening in the dashboard, and a valve arranged in said casing intermediate the ends thereof.

5. In an automobile, the combination with a cowl having a ventilating opening, and a dash board provided with an opening, of an angular conduit disposed at one side of the dashboard and having at one end an outlet opening registering with the ventilating opening in the cowl, and at its other end an outlet opening for directing heated air into the interior of the automobile, said conduit intermediate its ends being provided with an intake opening registering with the opening in said dashboard, a valve controlling said inlet opening, control means for the valve, a casing arranged at a relatively opposite side of the dashboard and being open at each end, said casing having one end thereof registering with the opening in the dashboard, and a valve arranged in said casing intermediate the ends thereof, said casing being also provided with an inlet neck projecting laterally therefrom, and flexible conduit means connecting said neck with a hot air stove associated with the exhaust manifold of an internal combustion engine.

6. In combination with the cowl having a ventilating opening, and the dash board of the automobile, said dash board having an opening provided therein, of a casing projecting from one side of the dashboard and having one open end registering with the opening in the dashboard, a screen disposed across the open free end of the casing, said casing intermediate its ends being also provided with a hot air inlet, and a conduit on a relatively opposite side of the dashboard and having a branch leading from the opening in the dashboard to the opening in the cowl, together with a second branch extending at an angle to the first named branch and having an open end arranged to direct heated air into the interior of the automobile.

7. In combination with the cowl having a ventilating opening, and the dash board of the automobile, said dash board having an opening provided herein, of a casing projecting from one side of the dashboard and having one open end registering with the opening in the dashboard, a screen disposed across the open free end of the casing, said casing intermediate its ends being also provided with a hot air inlet and a conduit on a relatively opposite side of the dashboard and having a branch leading from the opening in the dashboard to the opening in the cowl, together with a second branch extending at an angle to the first named branch and having an open end arranged to direct heated air into the interior of the automobile, a valve arranged in said casing at one side of said inlet, a valve arranged in said conduit at the junction of the first and second named branches of said conduit, and individual means for each of said valves for securing them in desired adjusted positions.

In testimony whereof I affix my signature.

JAMES A. DEAL.